US008275989B2

(12) United States Patent
Huitema et al.

(10) Patent No.: US 8,275,989 B2
(45) Date of Patent: Sep. 25, 2012

(54) METHOD OF NEGOTIATING SECURITY PARAMETERS AND AUTHENTICATING USERS INTERCONNECTED TO A NETWORK

(75) Inventors: Christian Huitema, Clyde Hill, WA (US); Paul G. Mayfield, Sammamish, WA (US); Brian D. Swander, Bellevue, WA (US); Sara Bitan, Moshav Hadar-AM (IL); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 109 days.

(21) Appl. No.: 12/500,381

(22) Filed: Jul. 9, 2009

(65) Prior Publication Data

US 2009/0276828 A1 Nov. 5, 2009

Related U.S. Application Data

(62) Division of application No. 10/713,980, filed on Nov. 14, 2003, now Pat. No. 7,574,603.

(51) Int. Cl.
*H04L 29/06* (2006.01)
(52) U.S. Cl. ............... 713/171; 713/166; 380/277
(58) Field of Classification Search ............... 713/171
See application file for complete search history.

(56) References Cited

U.S. PATENT DOCUMENTS

| 5,220,603 | A | 6/1993 | Parker |
| 5,241,594 | A | 8/1993 | Kung |
| 5,442,342 | A | 8/1995 | Kung |
| 5,515,441 | A | 5/1996 | Faucher |
| 5,544,322 | A | 8/1996 | Cheng et al. |
| 5,692,124 | A | 11/1997 | Holden et al. |
| 5,815,574 | A | 9/1998 | Fortinsky |
| 6,141,758 | A | 10/2000 | Benantar et al. |
| 6,170,057 | B1 | 1/2001 | Inoue et al. |
| 6,269,402 | B1 | 7/2001 | Lin et al. |
| 6,330,562 | B1 | 12/2001 | Boden et al. |
| 6,418,130 | B1 | 7/2002 | Cheng et al. |
| 6,457,061 | B1 | 9/2002 | Bal et al. |

(Continued)

FOREIGN PATENT DOCUMENTS

WO WO 00/78008 12/2000

(Continued)

OTHER PUBLICATIONS

Charlie Kaufman, "Internet Key Exchange (IKEv2) Protocol", Oct. 9, 2003, submitted as an IDS reference on Dec. 10, 2009.*

(Continued)

*Primary Examiner* — Edward Zee
*Assistant Examiner* — Yogesh Paliwal
(74) *Attorney, Agent, or Firm* — Merchant & Gould, P.C.

(57) ABSTRACT

A method for authenticating and negotiating security parameters among two or more network devices is disclosed. The method has a plurality of modes including a plurality of messages exchanged between the two or more network devices. In a main mode, the two or more network devices establish a secure channel and select security parameters to be used during a quick mode and a user mode. In the quick mode, the two or more computers derive a set of keys to secure data sent according to a security protocol. The optional user mode provides a means of authenticating one or more users associated with the two or more network devices. A portion of the quick mode is conducted during the main mode thereby minimizing the plurality of messages that need to be exchanged between the initiator and the responder.

19 Claims, 11 Drawing Sheets

U.S. PATENT DOCUMENTS

| | | | |
|---|---|---|---|
| 6,563,824 | B1 | 5/2003 | Bhatia et al. |
| 6,643,774 | B1 | 11/2003 | McGarvey |
| 6,795,917 | B1 | 9/2004 | Ylonen |
| 6,904,529 | B1 | 6/2005 | Swander |
| 6,957,346 | B1 | 10/2005 | Kivinen et al. |
| 6,959,336 | B2 | 10/2005 | Moreh et al. |
| RE38,902 | E | 11/2005 | Srisuresh et al. |
| 6,986,061 | B1 | 1/2006 | Kunzinger |
| 7,028,186 | B1 | 4/2006 | Stenman et al. |
| 7,032,242 | B1 | 4/2006 | Grabelsky et al. |
| 7,062,654 | B2 | 6/2006 | Millen et al. |
| 7,386,881 | B2 | 6/2008 | Swander et al. |
| 7,574,603 | B2 | 8/2009 | Swander et al. |
| 2001/0042201 | A1 | 11/2001 | Yamaguchi et al. |
| 2002/0035699 | A1 | 3/2002 | Crosbie |
| 2002/0052200 | A1* | 5/2002 | Arkko et al. ............... 455/432 |
| 2002/0138623 | A1 | 9/2002 | Boden et al. |
| 2002/0178377 | A1 | 11/2002 | Hemsath et al. |
| 2003/0070092 | A1 | 4/2003 | Hawkes et al. |
| 2003/0142823 | A1 | 7/2003 | Swander et al. |
| 2003/0154399 | A1 | 8/2003 | Zuk et al. |
| 2003/0185219 | A1 | 10/2003 | Maynard |
| 2003/0200433 | A1 | 10/2003 | Stirbu |
| 2003/0212806 | A1 | 11/2003 | Mowers et al. |
| 2003/0212901 | A1 | 11/2003 | Mishra et al. |
| 2003/0217285 | A1 | 11/2003 | Sanchez Herrero et al. |
| 2004/0083295 | A1 | 4/2004 | Amara et al. |
| 2004/0088537 | A1 | 5/2004 | Swander et al. |
| 2004/0133798 | A1 | 7/2004 | Swander |
| 2004/0151322 | A1 | 8/2004 | Sovio et al. |
| 2004/0250131 | A1 | 12/2004 | Swander et al. |
| 2004/0268124 | A1 | 12/2004 | Narayanan |
| 2005/0005165 | A1 | 1/2005 | Morgan et al. |
| 2005/0009501 | A1 | 1/2005 | Kekki |
| 2005/0010765 | A1 | 1/2005 | Swander et al. |
| 2005/0022010 | A1 | 1/2005 | Swander et al. |
| 2005/0022011 | A1 | 1/2005 | Swander et al. |
| 2005/0102514 | A1* | 5/2005 | Bergenwall et al. .......... 713/168 |
| 2005/0108531 | A1 | 5/2005 | Swander et al. |
| 2005/0114704 | A1 | 5/2005 | Swander et al. |
| 2005/0135359 | A1 | 6/2005 | Chang |
| 2005/0138416 | A1 | 6/2005 | Qian et al. |
| 2005/0144463 | A1 | 6/2005 | Rossebo et al. |
| 2005/0149732 | A1 | 7/2005 | Freeman et al. |
| 2006/0005008 | A1 | 1/2006 | Kao |
| 2006/0015935 | A1 | 1/2006 | Dixon et al. |
| 2006/0078119 | A1 | 4/2006 | Jee et al. |
| 2006/0101149 | A1 | 5/2006 | Deininger et al. |
| 2006/0105741 | A1 | 5/2006 | Suh et al. |
| 2007/0011448 | A1 | 1/2007 | Chhabra et al. |

FOREIGN PATENT DOCUMENTS

| | | |
|---|---|---|
| WO | WO0201827 | 1/2002 |

OTHER PUBLICATIONS

J. Zhou, "Further Analysis of the Internet Key Exchange Protocol", Computer Communications, vol. 23, Issue 17: pp. 1606-1612, Publication: 2000.*

Nir, Y., *Repeated Authentication in Internet Key Exchange (IKEv2) Protocol* [online], RFC 4478, Apr. 2006, [Retrieved Jul. 2, 2007], Retrieved from; ftp://ftp.rfc-editor.org/in-notes/rfc4478.txt, pp. 1-6.

Pereira, R., Beaulieu, S.,*Extended Authentication within ISAKMP/Oakley (XAUTH)* [online ],Dec. 19, [Retrieved Aug. 10, 2007], Retrieved from http://tools.ietf.org/id/draft-ietf-ipsec-isakmp-xauth-06.txt, pp. 1-25.

Sakane, S., Kamada, K., Thomas, M., Vilhuber, J., *Kerberized Internet Negotiation of Keys (KINK)*[online], Dec. 8, 2005, [Retrieved Dec. 7, 2007], Retrieved from: http://tools.ietf.org/html/draft-ietfkink-Kink- 11, pp. 1-42.

Thomas, M., *Kerberized Internet Negotiation o/Keys* [online], Aug. 9, 2000, [Retrieved Dec. 7, 2007], Retrieved from: http://www3.ietf.org/proceedings/00dec/I-D/draft-ietf-kink-reqmt-00,txt. 6 pgs.

Maughan, D.; Schertler, M.; Schneider, M.; Turner, J. *Internet Security Association and Key Mangement Protocol (ISAKMP)*, Nov. 1998, RFC 2408, pp. 1-81.

JaeDock Lim, MinHo Han, JeongNyeo Kim, "Implementation of light-weight IKE protocol for IPsec VPN within Router," This paper appears in: Advanced Communication Technology, 2005, ICACT 2005. Publication Date: Feb. 21-23, 2005, vol. I, pp. 81-84. http://ieeexplore.ieee.org/ieI5/9886/31419/0 1461739.pdf?tp=&arnumber=1461739&isnumber=31419.

Perlman, R., Kaufinan, C., "Key Exchange in IPsec: Analysis of IKE," This paper appears in: Internet Computing, IEEE Publication Date: Nov./Dec. 2000, vol. 4, Issue: 6, pp. 50-56. http://ieeexplore.ieee.org/ie15/4236/ 19367/00895016.pdf?isnumber=arnumber=895016.

Meadows, C., "Analysis of the Internet Key Exchange Protocol Using the NRL Protocol Analyzer" This paper appears in: Security and Privacy, 1999. Proceedings of the 1999 IEEE Symposium on Publication Date: 1999, pp. 216-231. http://ieeexplore.ieee.org/ielS/622011660S/00766916.pdf?isnumber=arnumber=766916.

Matsuura, Kanta; Imai, Hideki, "Modified aggressive mode of internet key exchange resistant against denial-of-service attacks," Publication Date: May 2000, vol. E83-D, Issue No. 5, pp. 972-979. http://www .csa.com/partners/viewrecord. php?requester=gs&collection=TRD&recid=494I82CI.

Internet Assigned Numbers Authority, "ISAKMP Registry", http://www.iana.org/assignments/isakmp-registry, pp. 1-9.

Internet Assigned Numbers Authority, "IPsec Registry", http://www.iana.org/assignments/ipsec-registry, pp. 1-4.

Bradner, S., "Key words for use in RFCs to Indicate Requirement Levels", BCP 14, RFC 2119, Mar. 1997, http://www.ietf.org/rfc/rfc2119.txt, 3 pgs.

Piper, D., "The Internet IP Security Domain of Interpretation for ISAKMP", RFC 2407, Nov. 1998, http://www.ietf.org/rfc/rfc2407.txt, pp. 1-30.

D. Harkins, D. Carrel, "The Internet Key Exchange (IKE)", Nov. 1998, RFC 2409, http://www,ietf.org/rfc/rfc2409.txt, pp. 1-39.

Kent, S. and K. Seo, "Security Architecture for the Internet Protocol", RFC 4301, Dec. 2005, http://www.ietf.org/rfc/rfc4301.txt 190 pgs.

Kent, S., "IP Encapsulating Security Payload (ESP)", RFC 4303, Dec. 2005, http://www.ietf.org/rfc/rfc4301.txt, 42 pgs.

National Institute of Standards and Technology, "FIPS 180-2, Secure Hash Standard (SHS)", Aug. 2002, http://csrc.nist.gov/publications/fips/fips_180-2/fips_180-2withchangenotice.pdf, 83 pgs.

Barker, E Johnson, D., M. Smid, "Recommendation for Pair-Wise Key Establishment Schemes USing Discrete Logarithm Cryptography", http://csrc.nist.gov/publications/nistpubs/800-S6A/sp800-S6A_May-3-06,pdf, pp. 1-116.

Mark Vandenwauver, Ren'e Govaerts, Joos Vandewalle, "How Role Based Access Control is implemented in SESAME," Publication Date: 1997, 6 pgs. http://www.cosic.esat.kuleuven.ac.be/sesame/papers/wetice97.pdf https://www.cosic.esat.kuleuven.ac.be/sesame/htmVsesame_links.htm.

D.W.Chadwick, A. Otenko, "RBAC policies in xml for x.509 based privilege management," Publication Date: May 2002. http://sec.cs.kent.ac.uk/download/Sec2002Final.pdf, pp. 1-15. (http://citeseer.ist.psu.edulcontext/2397834/0).

"Unified Login with Pluggable Authentication Modules (PAM)," Conference on Computer and Communications Security, Proceedings of the 3rd ACM conference on Computer and communications security, Publication Date: 1996, pp. 1-10 http://delivery.acm.orgII0.1145/240000/238177/plsamar. Pdf?key1=238177&key2=6437033511&coll=GUIDE&dl=GUIDE&CFID=18053:11&CFTOKEN=10796813).

Niamh Quinn, Mark Smith, Petra Hoepner, Eric Malville, Tom-Arthur, "EURESCOM Technical Information," Technology Assessment of Middleware for Telecommunications, Publication Date: Jul. 2001. http://www.eurescom.del~pub-deliverables/p900-series/P910/TI25/p91Oti25.pdf.

William A. Adamson, Jim Rees, and Peter Honeyman, "Joining Security Realms: A Single Login for NetWare and Kerberos," Proceedings of the Fifth USENIX UNIX Security Symposium, Publication Date: Jun. 1995. 11 pgs. http://www.usenix.org/publications/library/proceedings/security95/full_papers/adamson.ps.

Aboba, et al., "RFC 3748—Extensible Authentication Protocol (EAP)," Network Working Group, Jun. 2004, 74 pgs.

Harkins, et al., "RFC 2409—The Internet Key Exchange (IKE)," Network Working Group, Nov. 1998, 46 pgs.

Kaufman, C., "RFC 4306—Internet Key Exchange (IKEv2) Protocol," Network Working Group, Dec. 2005, 108 pgs.

Piper, D., B. Swander, "A GSS-API Authentication Method for IKE", Jul. 2001, Internet Draft, http://www3.ietf.org/proceedings/02mar/ID/draft-ietf-ipsec-isakmp-gss-auth-07.txt, pp. 1-13.

J. Laganier et al.; Using IKE with IPv6 Cryptographically Generated Address draft-laganier-ike-ipv6-cga-01; Network Working Group Internet-Draft, Jun. 30, 2003; 21 pgs.

Charlie Kaufman, Editor; Internet Key Exchange (IKEv2) Protocol; INTERNETDRAFT draft-letf-ipsec-ikev2-11.txt; Oct. 9, 2003; 100 pgs.

U.S. Appl. No. 10/713,980, filed Nov. 14, 2003, Office Action mailed Aug. 10, 2007, 9 pages.

U.S. Appl. No. 10/713,980, filed Nov. 14, 2003, Amendment and Response filed Jan. 10, 2008, 10 pgs.

U.S. Appl. No. 10/713,980, filed Nov. 14, 2003, Final Office Action mailed Apr. 21, 2008, 13 pages.

U.S. Appl. No. 10/713,980, filed Nov. 14, 2003, Amendment and Response filed May 15, 2008, 10 pgs.

U.S. Appl. No. 10/713,980, filed Nov. 14, 2003, Supplemental Amendment and Response filed Jun. 26, 2008, 6 pgs.

U.S. Appl. No. 10/713,980, filed Nov. 14, 2003, Office Action mailed Sep. 2, 2008, 11 pages.

U.S. Appl. No. 10/713,980, filed Nov. 14, 2003, Amendment and Response filed Jan. 2, 2009, 11 pgs.

U.S. Appl. No. 10/713,980, filed Nov. 14, 2003, Notice of Allowance mailed Apr. 3, 2009, 7 pages.

International Search Report and Written Opinion for International Application No. PCT/US06/26370 mailed Jun. 25, 2008.

U.S. Appl. No. 11/175,923, filed Jul. 6, 2005, Office Action mailed Jun. 13, 2008, 16 pages.

U.S. Appl. No. 11/175,923, filed Jul. 6, 2005, Amendment and Response filed Sep. 15, 2008, 10 pages.

U.S. Appl. No. 11/175,923, filed Jul. 6, 2005, Final Office Action mailed Dec. 11, 2008, 15 pages.

U.S. Appl. No. 11/175,923, filed Jul. 6, 2005, Amendment and Response filed Mar. 11, 2009, 5 pages.

U.S. Appl. No. 11/175,923, filed Jul. 6, 2005, Advisory Action mailed Mar. 19, 2009, 3 pages.

U.S. Appl. No. 11/175,923, filed Jul. 6, 2005, Amendment and Response filed May 11, 2009, 10 pages.

U.S. Appl. No. 11/175,923, filed Jul. 6, 2005, Office Action mailed Jun. 17, 2009, 15 pages.

U.S. Appl. No. 11/175,923, filed Jul. 6, 2005, Amendment and Response filed Sep. 14, 2009, 10 pages.

U.S. Appl. No. 11/175,923, filed Jul. 6, 2005, Final Office Action mailed Nov. 17, 2009, 16 pages.

U.S. Appl. No. 11/175,923, filed Jul. 6, 2005, Amendment and Response filed Feb. 17, 2010, 11 pages.

U.S. Appl. No. 11/175,923, filed Jul. 6, 2005, Office Action mailed Mar. 10, 2010, 14 pgs.

U.S. Appl. No. 11/175,923, filed Jul. 6, 2005, Amendment and Response filed Jun. 10, 2010, 10 pages.

U.S. Appl. No. 11/175,923, filed Jul. 6, 2005, Office Action mailed Aug. 23, 2010, 13 pgs.

U.S. Appl. No. 11/175,923, filed Jul. 6, 2005, Amendment and Response filed Nov. 8, 2010, 6 pages.

U.S. Appl. No. 11/175,923, filed Jul. 6, 2005, Office Action mailed Feb. 1, 2011, 9 pgs.

U.S. Appl. No. 11/175,923, filed Jul. 6, 2005, Amendment and Response filed Apr. 27, 2011, 6 pages.

U.S. Appl. No. 11/175,923, filed Jul. 6, 2005, Final Office Action mailed May 13, 2011, 10 pages.

Aboba, B. et al. "IPsec-NAT Compatibility Requirements," IPSec Working Group, Internet-Draft, Aug. 18, 2002, pp. 1-16.

Harkins, D. et al. "The Internet Key Exchange (IKE)," RFC 2409, Nov. 1998, pp. 1-42.

Huttunen, A. et al. "UDP Encapsulation of IPsec Packets," IP Security Protocol Working Group (IPSEC) Internet Draft, Dec. 2002, pp. 1-8.

Kent, S. et al. "IP Encapsulating Security Payload (ESP)", Network Working Group, Request for Comments: 2406, Nov. 1998, pp. 1-20.

Kent, S. et al. "Security Architecture for the Internet Protocol," Network Working Group, Request for Comments: 2401, Nov. 1998, pp. 1-67.

Srisuresh, P. et al. "IP Network Address Translator (NAT) Terminology and Considerations," RFC 2663, Aug. 1999, pp. 1-31.

*SSH IPSEC Express*, SSH Communications Security, White Paper, ipSEC Express-Version 2.0, Aug. 1999, pp. 1-31.

U.S. Appl. No. 10/348,594, Advisory Action mailed May 18, 2007, 3 pgs.

U.S. Appl. No. 10/348,594, Amendment and Response filed Nov. 2, 2007, 11 pgs.

U.S. Appl. No. 10/348,594, Amendment and Response filed Dec. 4, 2006, 15 pgs.

U.S. Appl. No. 10/348,594, Amendment and Response filed May 10, 2007, 15 pgs.

U.S. Appl. No. 10/348,594, Notice of Allowance mailed Jan. 22, 2008, 7 pgs.

U.S. Appl. No. 10/348,594, Office Action mailed Mar. 6, 2007, 8 pgs.
U.S. Appl. No. 10/348,594, Office Action mailed Aug. 3, 2007, 8 pgs.
U.S. Appl. No. 10/348,594, Office Action mailed Aug. 31, 2006, 9 pgs.

* cited by examiner

METHOD OF NEGOTIATING SECURITY PARAMETERS AND AUTHENTICATING USERS INTERCONNECTED TO A NETWORK

CROSS-REFERENCE TO RELATED APPLICATIONS

This application is a divisional of and claims the benefit of U.S. patent application Ser. No. 10/713,980, filed on Nov. 14, 2003, and entitled "METHOD OF NEGOTIATING SECURITY PARAMETERS AND AUTHENTICATING USERS INTERCONNECTED TO A NETWORK," the disclosure of which is hereby incorporated herein, in its entirety, by reference.

FIELD OF THE INVENTION

This invention generally relates to the area of computer systems. More particularly, the present invention concerns methods for facilitating the use of a security protocol to protect network communications, and even more particularly to methods for negotiating security parameters and authenticating users interconnected to a network.

BACKGROUND OF THE INVENTION

Computer networks provide an efficient way to exchange information between two or more computers. Various types of computer networks are utilized including private networks, e.g. a local area networks (LANs), and public networks, e.g. the Internet. Often, the information exchanged between computers is of a sensitive or confidential nature. For example, to purchase goods or services via the network, a user is required to enter payment information such as a credit card number. Similarly, users routinely transmit sensitive and confidential business information over networks.

Information is exchanged over networks according to a protocol, such as the Internet Protocol (IP). IP was designed to allow for an open exchange of information; however, standard IP was not designed to protect information from unauthorized access. Accordingly, standard IP does not prevent an unauthorized user from receiving, viewing, and even modifying information transmitted over a network. Standard IP lacks other features such as authentication of users and network devices.

To address the lack of security provided by standard IP, the Internet Engineering Task Force (IETF) has developed a set of protocols, referred to as the Internet Protocol Security (IPSec) suite. IPSec provides protocols that conform to standard IP, but that include security features lacking in standard IP. Specific examples of IPSec protocols include an authentication header (AH) protocol and encapsulating security protocol (ESP). The ESP protocol, documented mainly in IETF Request for Comments (RFC) 2406, is an authenticating and encrypting protocol that uses cryptographic mechanisms to provide integrity, source authentication, and confidentiality of data. The AH protocol, documented mainly in IETF RFC 2402, is an authentication protocol that uses a hash signature in the packet header to validate the integrity of the packet data and authenticity of the sender.

Prior to using the ESP, AH or similar protocols, a first computer and a second computer in communication over the network must negotiate a set security parameters. The first computer begins the negotiation and is usually referred to as an initiator. The second computer is referred to as a responder because it is responding to a request from the initiator. The negotiated security parameters are stored in the initiator and the responder as one or more data structures referred to as a security association (SA). Parameters stored in the SA identify a security protocol (e.g. ESP or AH), a cryptographic algorithm used to secure communication (e.g. DES, 3DES), keys used with the cryptographic algorithm, a life time during which the keys are valid and the like.

One method of negotiating security parameters is by using a separate negotiation protocol. An example of a negotiation protocol is the internet key management and exchange protocol (IKE), also provided as part of IPSec and documented in IETF RFC 2409. The IKE protocol includes two phases. In a first phase, known as "main mode," the initiator and the responder establish an IKE SA thereby creating a secure channel for conducting IKE negotiations. In a second phase, known as "quick mode," the initiator and the responder use the IKE SA to negotiate general purpose SAs over the secure channel established in the first phase.

An IKE negotiation can fail for various reasons. As one example, the initiator and the responder can fail to agree on an acceptable set of security parameters. The initiator can attempt a new IKE negotiation by proposing different security parameters. However, IKE does not provide a mechanism for the initiator to predict whether the responder will accept the different set of proposed parameters. Accordingly, the new IKE negotiation may likewise fail.

Moreover, IKE provides for machine authentication, but not user authentication. Thus, while it is possible to verify the identity of a particular machine, it is not possible to verify the identity of a particular user. Some methods have been developed to incorporate user authentication into IKE using other known protocols such as Kerberos. However, these methods require that a new IKE main mode be conduced in conjunction with each user authentication.

Compatibility issues also exist when some protocols are combined with IKE. For example, when the initiator sends a request to the responder in clear text, meaning not according to a security protocol, and the responder requires secure communication, the responder initiates an IKE negotiation. When this occurs, the responder effectively becomes the initiator and the initiator effectively becomes the responder thereby subverting the roles of the initiator and the responder. Protocols, such as Kerberos, are sensitive to the direction of the negotiation and can fail when the roles of initiator and responder are subverted.

SUMMARY OF THE INVENTION

The present invention comprises a method for negotiating security parameters between a first computer, called an initiator, and a second computer, called a responder, interconnected to a network. The method includes both user and machine authentication. The method has a plurality of modes including a main mode and a quick mode conducted through the exchange of a plurality of messages between the initiator and the responder.

The main mode is used to perform machine one way or mutual machine authentication and to provide a secure channel for conducting the quick mode and user mode. One way machine authentication is used to prove the identity of one of, but not both, the initiator and the responder. Mutual machine authentication is used to prove the identity of both the initiator and the responder. The quick mode is used to derive and refresh keys used with IPSec protocols such as ESP and AH.

The invention further comprises an optional user mode. The user mode provides one way or mutual user authentication. One way user authentication is used to prove the identity of a particular user of one of, but not both, the initiator and the responder. Mutual user authentication is used to prove the identity of the users of both the initiator and responder. A plurality of user modes can be carried out following a single main mode.

The invention also provides for policy discoverability allowing the initiator to learn acceptable security policy of the responder and vice versa. Group data may optionally be exchanged between the initiator and responder, which data can be compared to a set of authorized groups to determine if communication is permitted and, if so, to select policy used during the communication. Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, is best understood from the following detailed description taken in conjunction with the accompanying drawings of which:

DETAILED DESCRIPTION OF THE DRAWINGS

Figure 1:
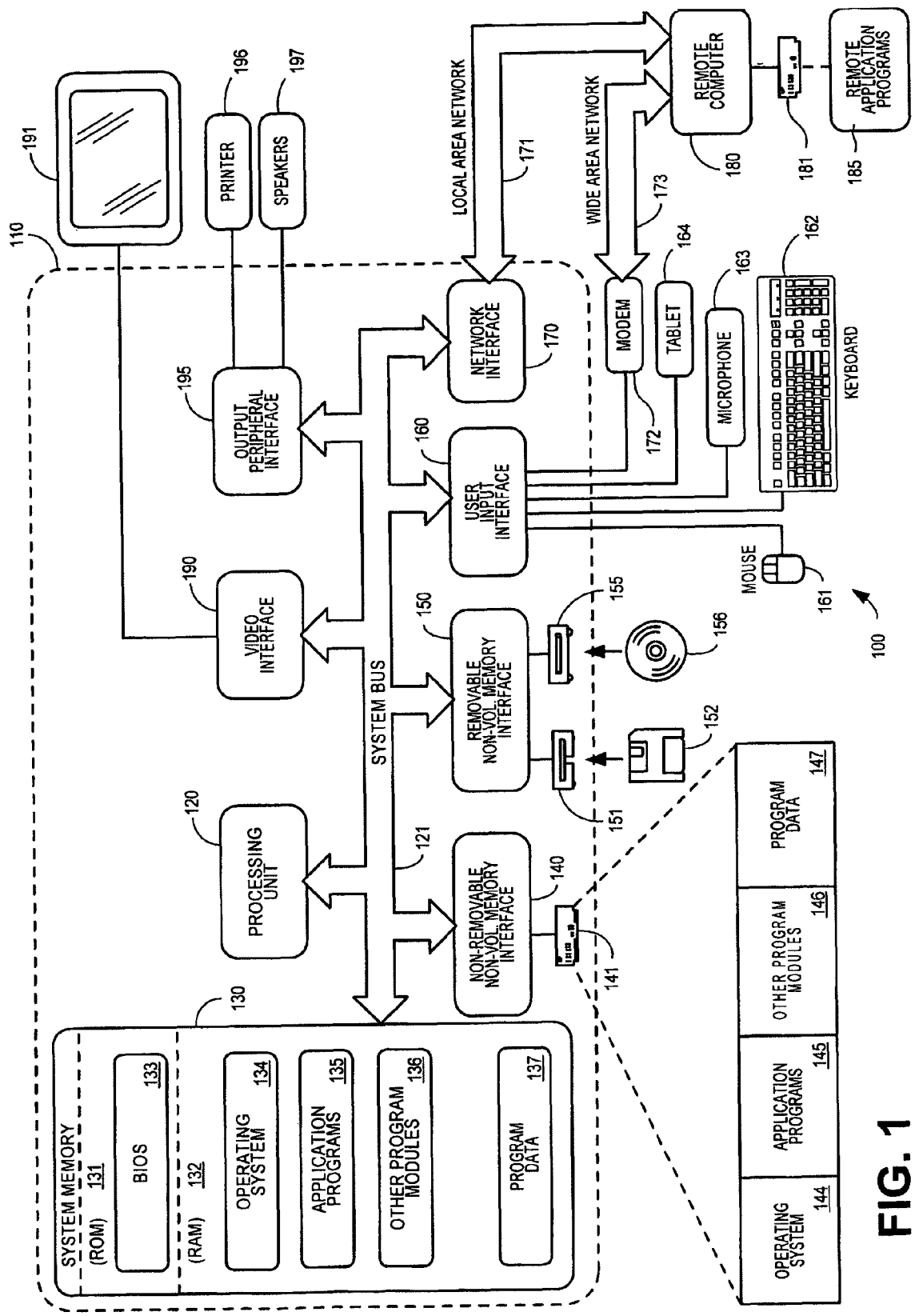
FIG. 1 is a simplified schematic illustrating an exemplary architecture of a network device for carrying out a method in accordance with an embodiment of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a network device, such as a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer, or network device, 110 operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
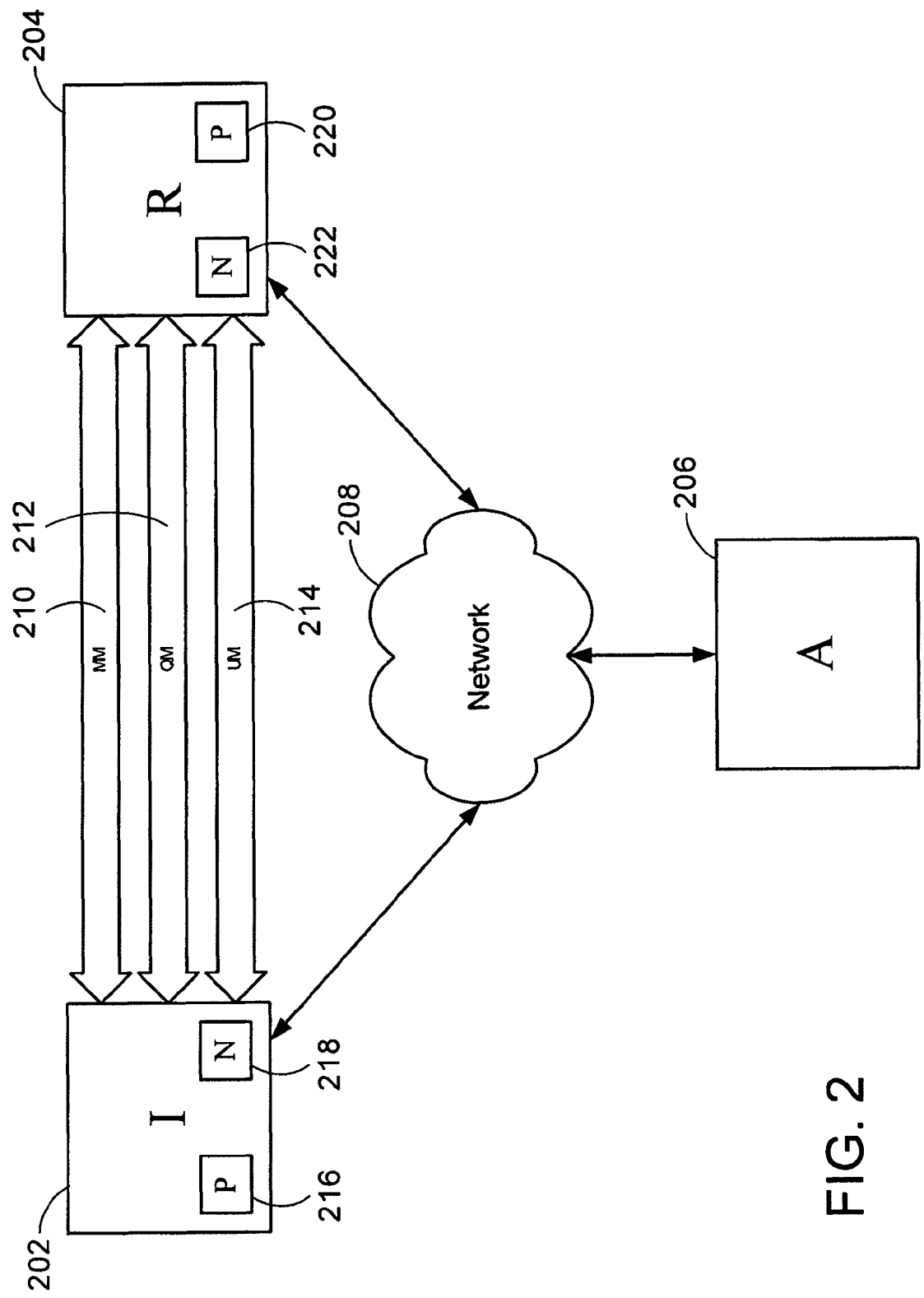
FIG. 2 is an exemplary network environment including multiple network devices coupled to a network.

FIG. 2 illustrates an exemplary network environment wherein the present invention is employed. The present invention is directed to a method for negotiating security parameters between networks devices in communication through one or more networks. The invention also provides features such as policy discoverability and mutual or one way machine and user authentication. The invention is implemented as an extension to existing protocols, such as the Internet key exchange and management protocol (IKE). Alternatively, the invention is implemented as a separate proprietary protocol.

The environment includes a plurality of network devices 202, 204, 206 communicatively coupled to a network 208. The network 208 is any suitable type such as a local area network (LAN), wide area networks (WAN), intranet, the Internet, or any combination thereof. For the purpose of illustrating the invention, only a limited number of network devices are shown. However, it will be understood that many network devices may, in fact, be coupled to the network. Moreover, although the network devices are illustrated as coupled directly to the network 208, the network devices are alternatively coupled to the network 208 through a combination of servers, routers, proxies, gateways, network address translation devices, or the like.

The network device 202 communicates, i.e. exchanges information, with the network device 204 by sending packets of data according to a protocol such as the Internet Protocol (IP). The network device 202, referred to herein as the initiator, begins the exchange of information by sending a request to the network device 204, referred to herein as the responder. The network device 206 is a malicious user that attempts to gain unauthorized access to the information exchanged between the initiator 202 and the responder 204. The malicious user 206 also attempts to mount attacks on one or more of the initiator 202 and the responder 204 through, for example, a denial of service attack.

The initiator 202 includes a security policy 216 stored in security policy data base. The security policy 216 is used by the initiator 202 to determine whether data transmitted to, or received from, another network device, such as the responder 204, needs to conform to a security protocol such as the Encapsulating Security Protocol (ESP) or Authentication Header (AH). The responder 204 includes its own security policy 220 stored in a security policy database that is used by the responder 204 to determine whether data transmitted to, or received from, another device, such as the initiator 202, needs to conform to a security protocol.

Security protocols such as AH and ESP protect the contents of data in an IP packet from the attacker 206. Before the security protocol is used to exchange data, the initiator 202 and the responder 204 must negotiate security parameters. The negotiated security parameters include an identification of the security protocol to be used (e.g. AH or ESP), an encryption algorithm that will be used to secure the data (e.g. DES or 3DES), keys used with the encryption algorithm to protect the data, life time that the keys will be valid and the like. The negotiated security parameters are stored in one or more data structures called a Security Association (SA).

The invention provides a method to negotiate the security parameters. The method includes a plurality of modes including a main mode 210, a quick mode 212, and a user mode 214. A negotiation between the initiator 202 and the responder 204 requires at least one main mode 210 and at least one quick mode 212. The user mode 214 is not required and is optionally conducted when user authentication is desired. Further, a one to one correspondence between the plurality of modes is not required. For example, a single main mode 210 supports a plurality of user modes 212 and a plurality of quick modes 212. A single user mode 214 supports a plurality of quick modes 212.

The method is executed by negotiation module 218 executing in the initiator 202 and negotiation module 222 executing in the responder 204. Each of the plurality of modes includes one or more pair of exchanges between the initiator 202 and the responder 204. Each exchange includes a first message sent from the initiator 202 to the responder 204 and a second message sent from the responder 204 to the initiator 202.

The main mode 210 is used to perform machine one way or mutual machine authentication, negotiate security parameters, and to provide a secure channel for conducting the quick mode 212 and user mode 214. One way machine authentication is used to prove the identity of one of, but not both, the initiator 202 and the responder 204. Mutual machine authentication is used to prove the identity of both the initiator 202 and the responder 204.

The quick mode 212 is used to derive and refresh keys used with IPSec protocols such as ESP and AH. Typically, the keys used with AH and ESP to encrypt and decrypt data have a limited life time defined by the SA, referred to as life time of the key. Thus, it necessary for the initiator 202 and responder 204 to periodically refresh keys used as part of the security protocol. Keys are refreshed by executing a new quick mode 212.

The user mode 214 provides one way or mutual user authentication. One way user authentication is used to prove the identity of a particular user of one of, but not both, the initiator 202 and the responder 204. Mutual user authentication is used to prove the identity of the users of both the initiator 202 and responder 204. Multiple users may be associated with a particular network device. For example, a plurality of users are associated with the initiator 202. Thus, according to the invention, a single main mode 210 is used to authenticate the network device of the initiator 202 to the responder 204 thereby providing machine authentication. The plurality of users are authenticated to the responder 204 by executing a plurality of user modes 214.

Figure 3:
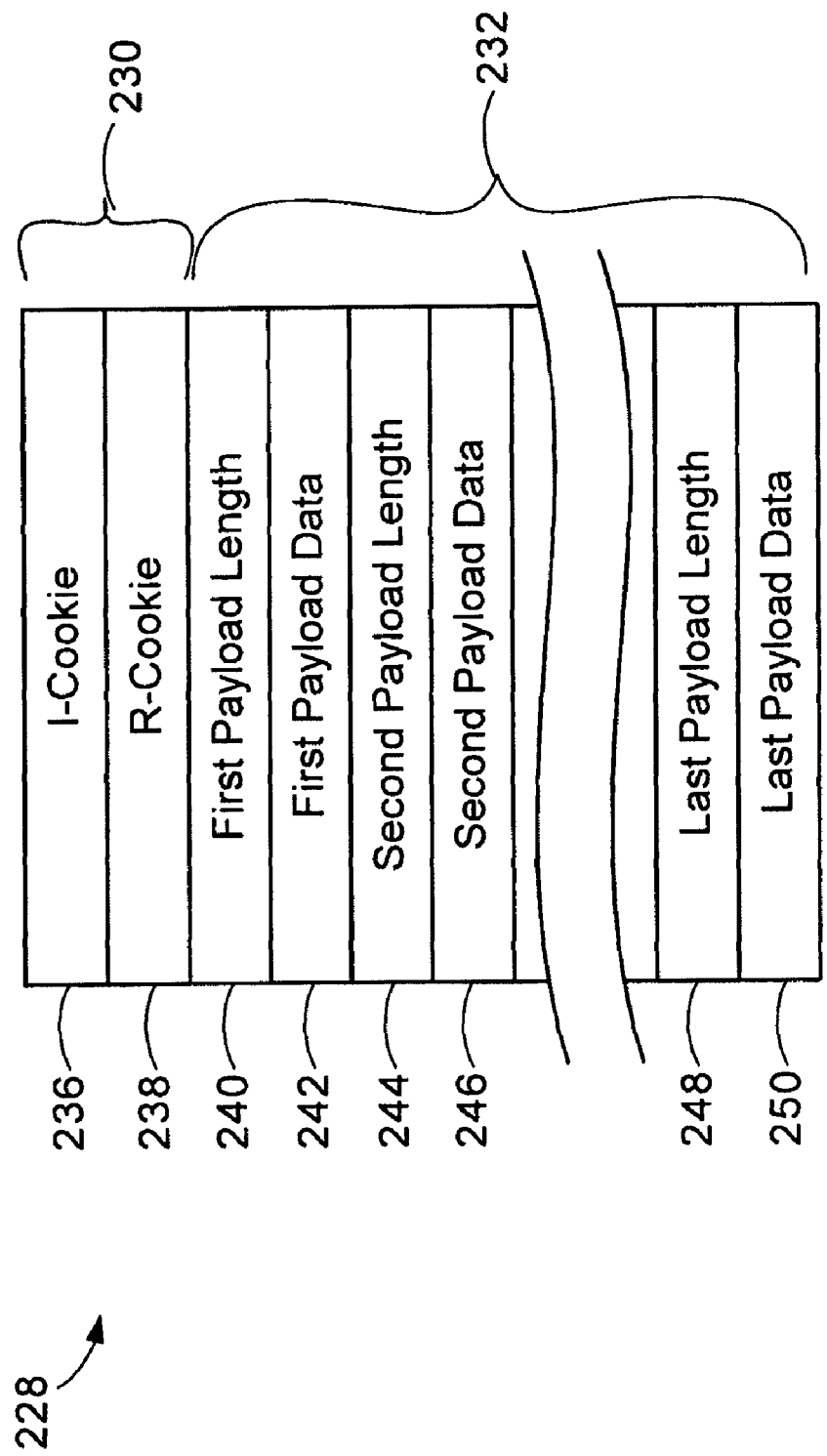
FIG. 3 is a simplified diagram of a packet payload format used to exchange payload data.

FIG. 3 illustrates an example of a packet 228, referred to herein as a message, used to exchange data between the initiator 202 and the responder 204. The packet or message 228 includes a header portion 230 and one or more payloads 232. The format illustrated in FIG. 3 generally conforms to the IKE protocol. It will be understood that the format described is by way of example, and not limitation, as any suitable format can be used to exchange data between the initiator 202 and the responder 204.

The header 230 includes an Initiator Cookie (I-Cookie) 236 and a Responder Cookie (R-Cookie) 238. The I-Cookie is a non-zero value assigned by the initiator 202 and the R-Cookie is a non-zero value assigned by the responder 204. It will be understood that the header is shown in simplified form and may include fields for additional data such as version data, flags, and a message length.

Each of the one or more payloads 232 includes a payload length field and a corresponding payload data field. The payload length field stores the size, e.g. in bytes, of the corresponding payload data. The payload data field stores data that varies depending on a payload type. The payload types included in the message depend upon the mode (e.g. main mode 210, quick mode 212, or user mode 214), state of the negotiation process, and security options employed by the initiator 202 and the responder 204. The different payload types and corresponding payload data are described in Table 1, below.

TABLE 1

| Payload Type | Payload Data |
| --- | --- |
| security association (SA) | The security association includes either proposed or agreed upon security parameters. |
| key exchange data (KE) | Data for a key exchange according to known methods such as a Diffie-Hellman key exchange or elliptical curve. |
| Main mode nonce (N) | Pseudo random number sent for signing during a main mode exchange. |
| Quick mode nonce (QmN) | Pseudo random number sent for authentication during a quick mode exchange. |
| Kerberos authentication data (SSPI) | Kerberos authentication data also referred to as GSSAPI. |
| Authentication data (AUTH) | A calculated value that incorporates a secret key. |
| Policy hint (PH) | Data transmitted by a sender that identifies security policy or parameters acceptable to the sender. |
| Certificate (CERT) | Includes data that establishes a users credentials to another user such as a name, serial number, expiration date, and public key. |
| Certificate Request (CERTreq) | Request for a network device to provide a certificate. |
| Identity payload (Id) | Data that identifies a network device, such as an IP address, domain (DNS) name, or fully-qualified domain name (FQDN). |
| Traffic selector (TS) | Identifies transmitted or received messages subject to a security policy. |
| Group advertisement (GA) | Identifies a group to which a user belongs. |
| Vendor Id (V-Id) | Generic data field that includes data to be transmitted from a first network device to a second network device. |
| Notify | Generic data field that includes data to be transmitted from a first network device to a second network device. |

The payload types described in Table 1 are identified herein with the subscript "i" to represent values associated with the initiator 202 and with the subscript "r" to represent values associated with the responder 204 where appropriate. For example, $N_i$ identifies a main mode nonce generated by the initiator 202 and $N_r$ identifies a main mode nonce generated by the responder 204.

Returning to FIG. 3, the message 228 may include a plurality of payloads and each payload has different payload data. The payload data is in the form of one of the payload types previously described herein. As shown, a first payload has a payload length 240 and corresponding first payload data 242; a second payload has a payload length 244 and corresponding second payload data 246; and a last payload has a last payload length 248 and corresponding last payload data 250.

The payloads are shown in simplified form and it will be understood that each payload may include additional information, such as data that identifies the payload types included therein.

Figure 4:
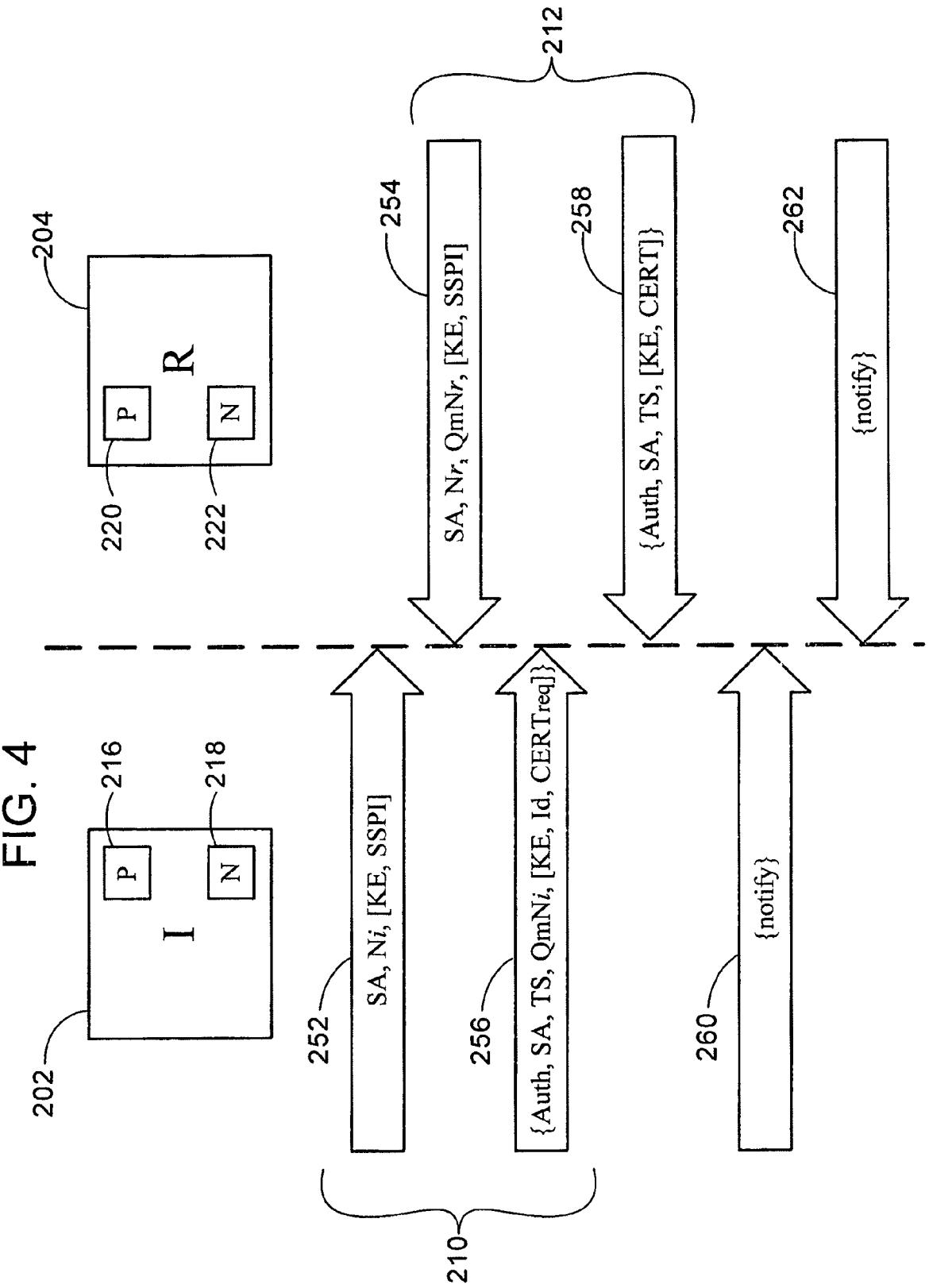
FIG. 4 is a diagram illustrating a method of conducting main mode and quick mode negotiations.

FIG. 4 illustrates a method for conducting a security negotiation between the initiator 202 and the responder 204 according to the present invention. As previously described, the negotiation is executed by the negotiation module 218 of the initiator 202 and the negotiation module 222 of the responder 204 in accordance with the respective security policies 216 and 220.

The method includes the main mode 210 and the quick mode 212. The main mode 210 and the quick mode 212 are completed through a plurality of messages exchanged between the initiator 202 and the responder 204. Messages 252 and 256 are messages sent from the initiator 202 to the responder 204. Messages 254 and 258 are messages sent from the responder 204 to the initiator 202.

The main mode 210 begins when the initiator 202 sends message 252 to the responder 204. The message 252 has a plurality of payload types including a proposed SA and a main mode nonce ($N_i$). The message further optionally includes an SSPI payload and key exchange data (KE). As previously described, the proposed SA includes proposed security parameters. The $N_i$ is a pseudo random number generated by the initiator 202. The SSPI is Kerberos authentication data used to authenticate a Diffie-Hellman exchange according to the method described in Piper et al., "A GSS-API Authentication Method for IKE," dated Jul. 14, 2001, which document is hereby expressly incorporated by reference. The use of SSPI is known and, accordingly, is not described in more detail herein.

The responder 204 receives the message 252 and in return sends the message 254 back to the initiator 202. The message 254 has a plurality of payload types including an agreed upon SA, a responder main mode nonce ($N_r$) a quick mode nonce ($QmN_r$) and optionally SSPI data and key exchange data (KE). The agreed upon SA includes security parameters, selected from the proposed security parameters, to which the responder 204 agrees. If the responder does not agree to a set of the parameters in the proposed SA, the negotiation fails.

The $N_r$ is a pseudo random number generated by the responder 204. The $QmN_r$ is also a pseudo random number generated by the responder 204. However, the $QmN_r$ is used to facilitate the quick mode 214, while the $N_r$ is used to facilitate the main mode 210. The message 254 is sent as a part of the main mode 210 and also as the beginning of quick mode 212. The SSPI is, as previously described, Kerberos authentication data.

The initiator 202 receives the message 254 and, in return, sends the message 256 to the responder 204. The message 256 has a plurality of payload types including authentication proof (AUTH), SA, traffic selector ($TS_i$), an initiator quick mode nonce ($QmN_i$) and optionally key exchange data (KE). The SA in the message 256 includes the security parameters for the quick mode.

The message 256 further optionally includes a certificate request payload (CERTreq) and identification (Id) payloads. The CERTreq payload requests a certificate from the responder. The Id payloads include an $Id_i$ payload that identified the initiator 202. The Id payloads may include an $Id_r$ payload if a previous negotiation attempt was made between the initiator 202 and the responder 204, but failed because the responder returned a parameter to the initiator that was unacceptable. An example of a parameter that the responder 204 may return which is unacceptable is a certificate. The $Id_r$ payload is sent, from the initiator 202 to the responder 204, in a subsequent negotiation attempt instructing the responder 204 to use a different parameter. For example, the $Id_r$ payload instructs the responder 204 to use a different certificate than was used in the previous negotiation.

The $TS_i$ identifies traffic to be protected according to the initiator's security policy. As an example, the TS identifies traffic by a 5-tuple of source and destination IP addresses, source and destination ports, and protocol type. $QmN_i$ is a pseudo random number generated by the initiator for the quick mode. The AUTH payload is a hash function incorporating a secret key, such as Kerberos secret key, of data previously sent in the messages exchanged between, and known only to, the initiator 202 and the responder 204. The AUTH is used to ensure that there is no attacker between the initiator 202 and the responder 204. The payload types in the message 256 are preferably encrypted using any known suitable method.

After the responder receives the message 256, the main mode 210 is complete. However, the quick mode 212 remains in process. The responder 204 sends message 258. The message 258 has a plurality of payload types including the AUTH, SA, responder traffic selectors ($TS_r$) and optionally key exchange data (KE) and certificate data (CERT). The AUTH is calculated as previously described. The $TS_r$ is the traffic selectors of the responder, which identifies the traffic to be protected by the responder's security policy. The payload types in the message 258 are preferably encrypted.

The method described with reference to FIG. 3 optionally includes message 260 sent from the initiator 202 to the responder 204 and message 262 sent from the responder 204 to the initiator 202. The messages 260 and 262 each include a notify payload type.

Other processes may exchange messages during the main mode 210 and quick mode 212. For example, an IPSec process executing in the initiator 202 and the responder 204 establish inbound and outbound IPSec SAs. The IPSec SAs define network policy to be used when communicating using a security protocol such as ESP or AH. An inbound IPSec SA at the initiator 202 is established prior to sending message 256, or alternatively, message 260 if the notify payload is sent. An outbound IPSec SA at the initiator 202 is established prior to sending message 258, or alternatively, message 262 if the notify payload is sent. Responder 204 inbound and outbound IPSec SAs are established prior to sending message 258.

After the main mode 210 and the quick mode 212 are complete, the quick mode nonces ($N_i$, $N_r$) are used by the initiator and the responder to derive keys according to known techniques. These keys are then used to encrypt traffic using protocols, such as are provided for by IPSec.

As illustrated in FIG. 4, the main mode 210 and the quick mode 212 overlap such messages 254 and 246 include payload types associated with the main mode 210 and the quick mode 212. Because the main mode 210 and the quick mode 212 overlap, the security negotiation is completed with a minimum number of exchanges between the initiator 202 and the responder 204. Additionally, the method provides a mechanism for signaling other processes, such as IPSec, when to perform separate negotiation tasks such as establishing IPSec SAs.

Figure 5:
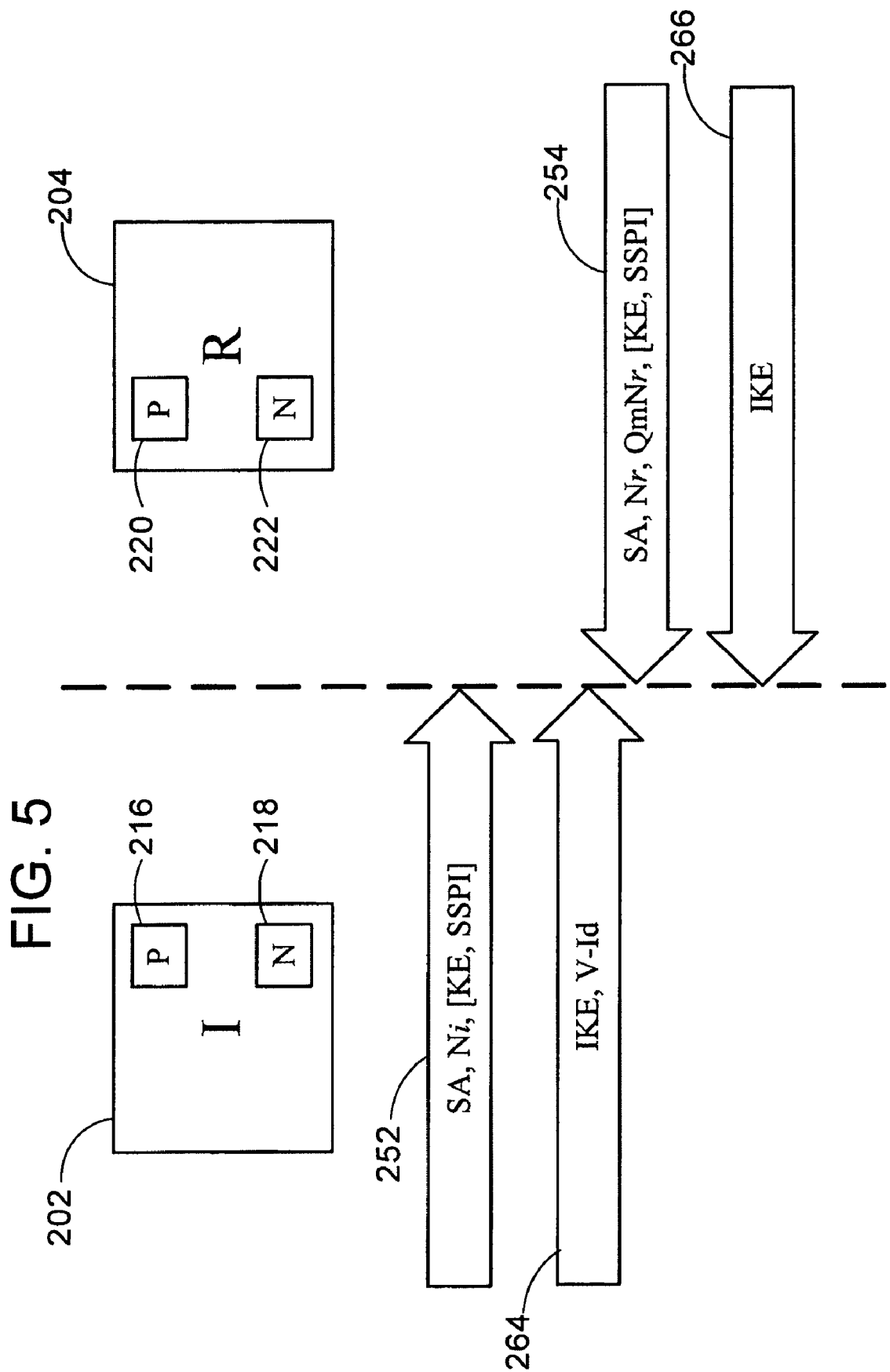
FIG. 5 is a diagram illustrating a method of initiating a main mode that provides legacy coexistence with prior negotiating protocols.

FIG. 5 illustrates an alternate method for beginning the main mode 210. The method provides a way for the initiator 202 to initiate the main mode 210 with the responder 204 when it is unknown whether the responder 204 is capable of conducting a negation according to the invention. If the responder 204 is not capable of conducting a negotiation according to the present invention, the negotiation is carried out using prior methods such as IKE.

The initiator 202 begins the main mode 210 by sending two messages 252 and 264. The message 252 is sent as described with reference to FIG. 4. The message 264 is a standard IKE main mode message with a Vendor-Id payload. The Vendor-Id payload includes data indicating that message 252 has also been sent.

The responder receives message 264. If the responder 204 is capable of negotiating according to the present invention, it reads the Vendor Id and from the data learns that main mode message 252 has also been sent. Accordingly, the responder 204 does not respond to message 264. Instead, the responder 204 waits for message 252, assuming the message 252 has not already been received. Once the message 252 is received, the responder 204 provides response 254 and the negotiation proceeds as described with reference to FIG. 4.

If the responder 204 is not capable of negotiating according to the present invention, the responder 204 receives message 252 and does not respond because the responder 204 is unable to interpret the packet. The responder 204 also receives message 264. The responder is able to interpret message 264 except for the Vendor Id, which is ignored. The responder then sends message 266 to the initiator, which message is a standard IKE response. The negotiation proceeds according to the IKE protocol.

Figure 6:
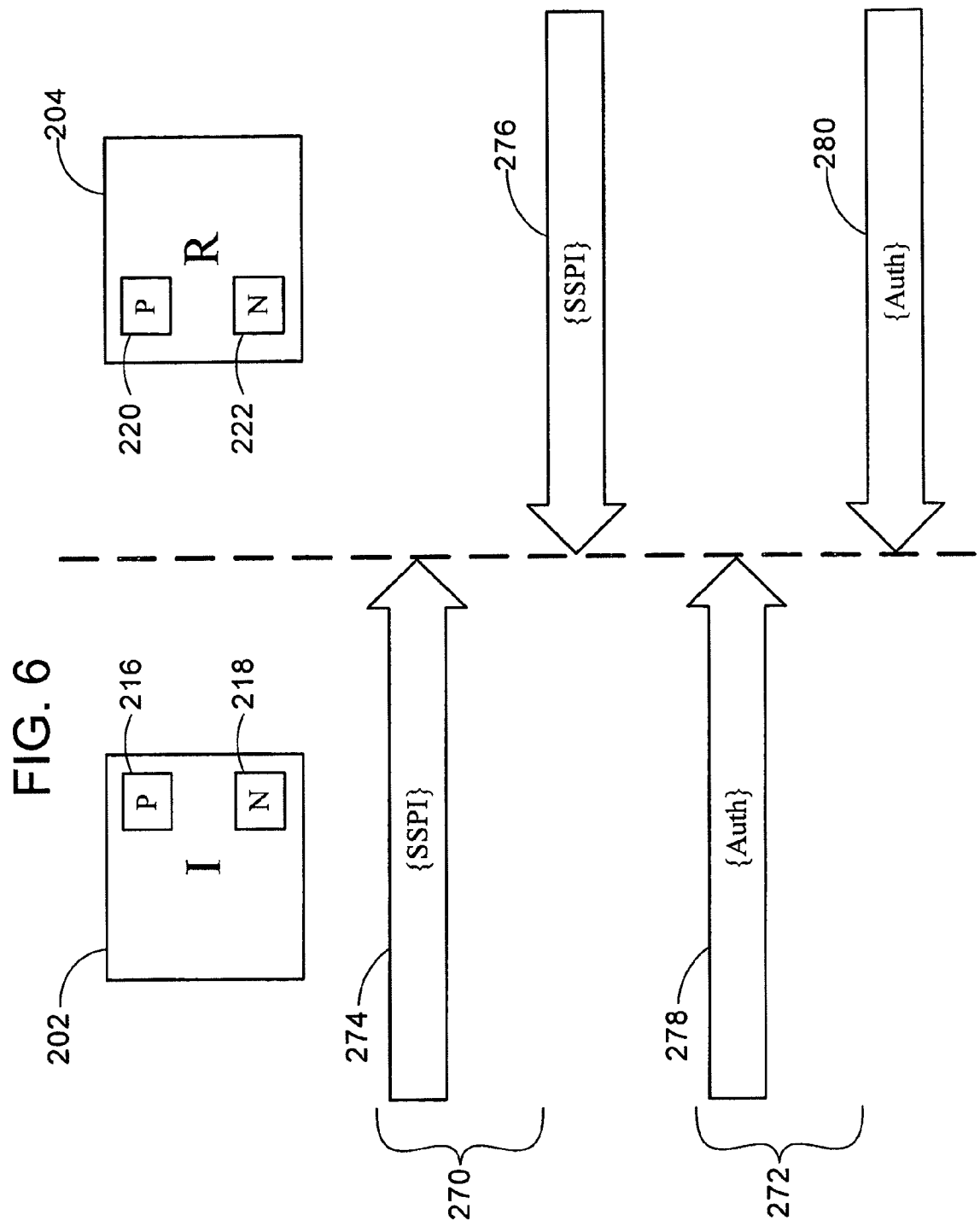
FIG. 6 is a diagram illustrating a method of conducting a user mode.

FIG. 6 illustrates the user mode 214 according to the present invention. The user mode is optionally conducted following the previously described main mode 210 and quick mode 212. The user mode 214 provides a method of authenticating one or more users. Although the user mode 214 is executed after the quick mode 212, the user mode 214 is completed before the quick mode 212 is activated.

As shown, the user mode 214 includes a first pair of messages 270 and a second pair of messages 272 exchanged between the initiator 202 and the responder 204. The first pair of messages 272 include a first messages 274, sent from the initiator 202 to the responder 204, and a second message 276 sent from the responder 204 to the initiator 202. Each of the messages 274, 276 have a payload type that includes authentication data, which is shown as an SSPI payload by way of example, and not limitation. As previously described, the SSPI payload is Kerberos authentication data. Additional exchanges may occur between the initiator 202 and the responder 204 with additional authentication payloads as needed.

The second pair of messages 272 includes a first message 278, sent from the initiator 202 to the responder 204, and a second message 280, sent from the responder 204 to the initiator 202. Each of the messages 278, 280, have a payload type that includes user authentication data (AUTH), which as previously described is a hash function over previously exchanged data known only to the initiator 202 and the responder 204 that incorporates a secret key.

The method of FIG. 6 provides a method of conducting user authentication that permits mutual or one way user authentication. As previously described, multiple user modes 214 are possible in conjunction with a single main mode 210.

Figure 7:
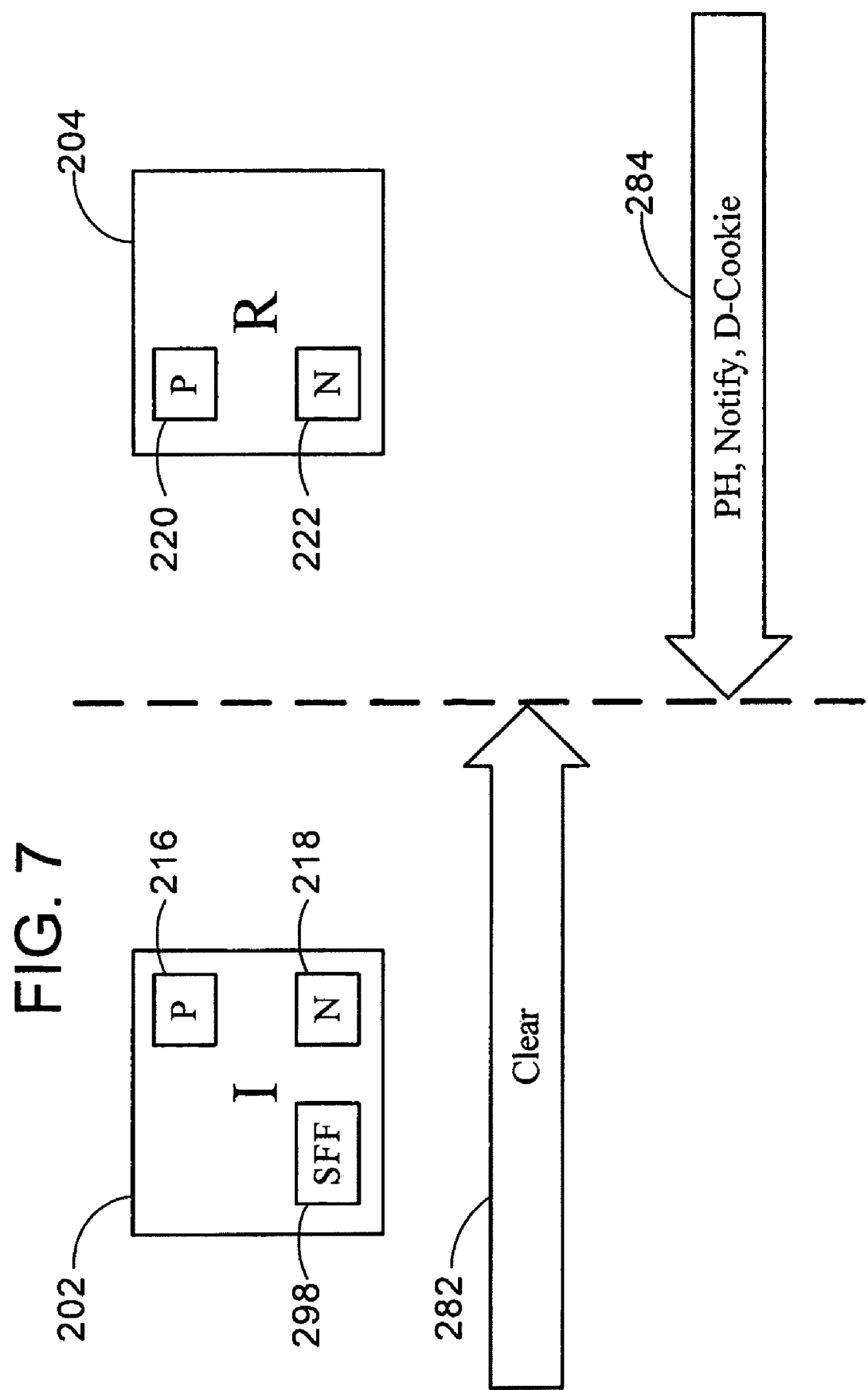
FIG. 7 is a diagram illustrating a method of dynamically discovering policy of a network device.
Figure 8:
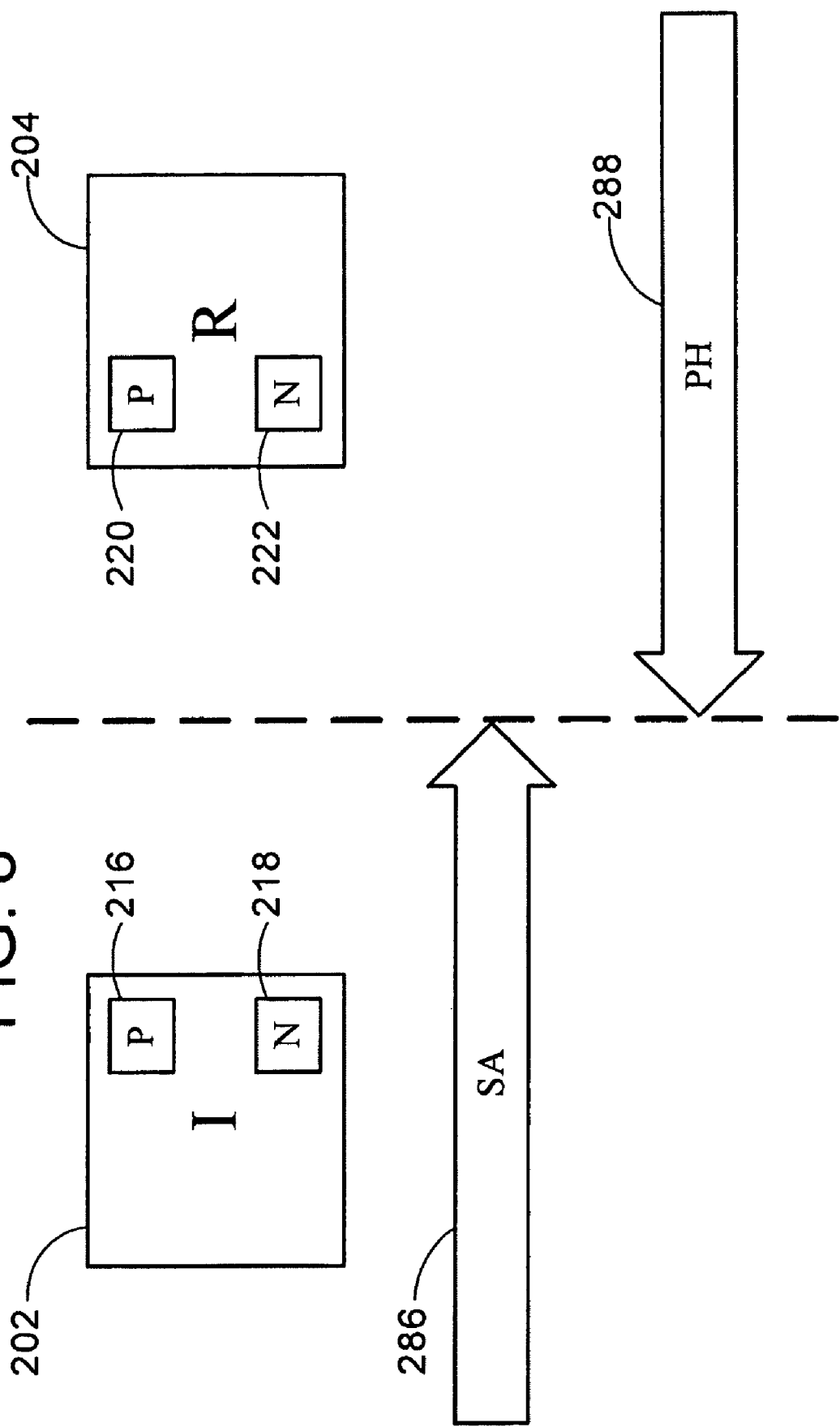
FIG. 8 is a diagram illustrating a method of dynamically discovering policy of a network device during a secure negotiation.

FIG. 7 and FIG. 8 illustrate methods according to the present invention that permit dynamic policy discoverability wherein the initiator 202 discovers security parameters that are acceptable to the responder 204. The methods provide a reliable way for the initiator 202 to propose a security association with a set of parameters acceptable to the responder 204.

In the method shown in FIG. 7, the initiator 202 sends a message 282 to the responder 204. The message 282 is any suitable data transmitted between devices interconnected by the network 208. For example, the message 282 includes a request to access data of the responder 204. In the example shown, the network policy 216 of the initiator 202 does not require secure communications with the responder 204. Accordingly, the message 282 is sent in clear text, i.e. is not encrypted or otherwise secured.

The network policy 220 of the responder 204 requires secure communication with other network devices, including at least the initiator 202. As a result, the responder 204 is unwilling to respond to the message 282 until secure communications are established between the initiator 202 and responder 204.

The responder 204 sends a response message 284 back to the initiator 202. The response message 284 includes a standard header 230 and payloads 232 (FIG. 3). The payloads include a notify payload type and a policy hint (PH) payload type. The notify payload type instructs the initiator 202 that secure communications are required. The notify payload can include any suitable data that identifies the need to conduct secure negotiations.

The PH payload includes data that identifies security parameters acceptable to the responder 204 according to the security policy 220 of the responder. Examples of security parameters identified in the PH payload include acceptable cryptographic mechanisms (e.g. DES or 3DES), keys, lifetime of keys and authentication methods (e.g. Kerberos, Certificates, pre-shared keys).

The response message 284 optionally includes a DOS cookie payload (D-Cookie). The D-Cookie includes the R-Cookie for the responder 204. Providing the initiator 202 with R-Cookie before the security negotiation begins obviates the needs for the responder 204 to maintain state, i.e. store data pertaining to communications with the initiator 202. Obviating the need to maintain state protects the responder 204 from denial of service attacks as further described in commonly owned co-pending U.S. patent application Ser. No. 10/337,763, entitled "Method and Apparatus for Preventing A Denial of Service Attack During Key Negotiation," filed Jan. 7, 2003 which document is hereby expressly incorporated by reference.

The initiator receives the response message 284. In an embodiment of the invention, the initiator 202 includes a stateful firewall filter (SFF) 298. The SFF 298 determines whether inbound messages are allowed to traverse a network stack within the initiator 202 or whether they should be dropped. An example of the SFF 298 is a process that tracks outbound messages from the initiator by source and destination IP address and ports and protocol type. The SFF 298 only allows inbound packets from devices to which communication was initiated by the initiator 202. The SFF 298 helps protect the initiator 202 from malicious network users. For example, the malicious attacker could attempt a denial of service attack on the initiator 202 by sending a large number of packets with false notify payloads using spoofed, i.e fake, IP addresses thereby monopolizing the resources of the initiator 202. An example of the SFF 298 is described in co-pending U.S. patent application Ser. No. 10/456,770, "A Multi-Layer Based Method for Implementing Network Based Firewalls," filed Jun. 6, 2003, which document is hereby expressly incorporated by reference. In the example, the initiator 202 sent the previous message 282 to the responder. Accordingly, the message 284 is permitted to traverse the network stack within the initiator as a result of being identified by the SFF 298 as a response to message 282.

After the initiator 202 receives the response message 284, it identifies from the notify payload that the responder 204 requires secure communications. The initiator 202 also identifies security parameters that are acceptable to the responder 204 from the PH payload. The initiator 202 then begins the main mode 210 with the responder 204 according to the method described with reference to FIG. 4. Preferably, the message 252 sent at the beginning the main mode 210 includes a proposed SA with parameters that match the security parameters in the PH payload.

According to the method of FIG. 7, the initiator 202 is able to identify acceptable security parameters according to the responder's security policy 220 by way of the PH payload thereby increasing the chances of a successful main mode negotiation between the initiator 202 and the responder 204. Additionally, the main mode 210 is initiated by the initiator 202 instead of the responder 204. Accordingly, the roles of the initiator 202 and responder 204 are not subverted.

FIG. 8 also illustrates a method wherein the initiator 202 discovers acceptable security parameters according to the responder's security policy 220. In contrast to FIG. 7, however, in the method illustrated in FIG. 8, the network policy 216 of the initiator 202 requires secure communications with the responder 204. Accordingly, the security negotiation module 218 of the initiator 202 begins communication with the responder 204 by initiating the main mode 210 as shown by message 286. The message 286, shown in simplified form, has a payload type of the proposed SA.

If the responder 204 agrees to a set of parameters within the proposed SA, the main mode 210, quick mode 212, and optionally user mode 214 are carried out in the manner previously described. If the responder 204 does not agree to a set of parameters within the proposed SA, the responder 204 sends message 288 having the PH payload type. As previously described, the PH payload type identifies security parameters acceptable to the responder 204 in accordance with the responder's security policy 220. This permits the initiator 202 to begin a new main mode 210 by sending a new message to the responder 204 with parameters in the proposed SA that will be acceptable to the responder 204 thereby increasing the chances of a successful negotiation with the responder 204. Alternatively, if the parameters in the PH payload type are unacceptable to the initiator 202, i.e. not according to the security policy 216 of the initiator, the initiator 202 elects not to attempt further communication with the responder 204.

Figure 9:
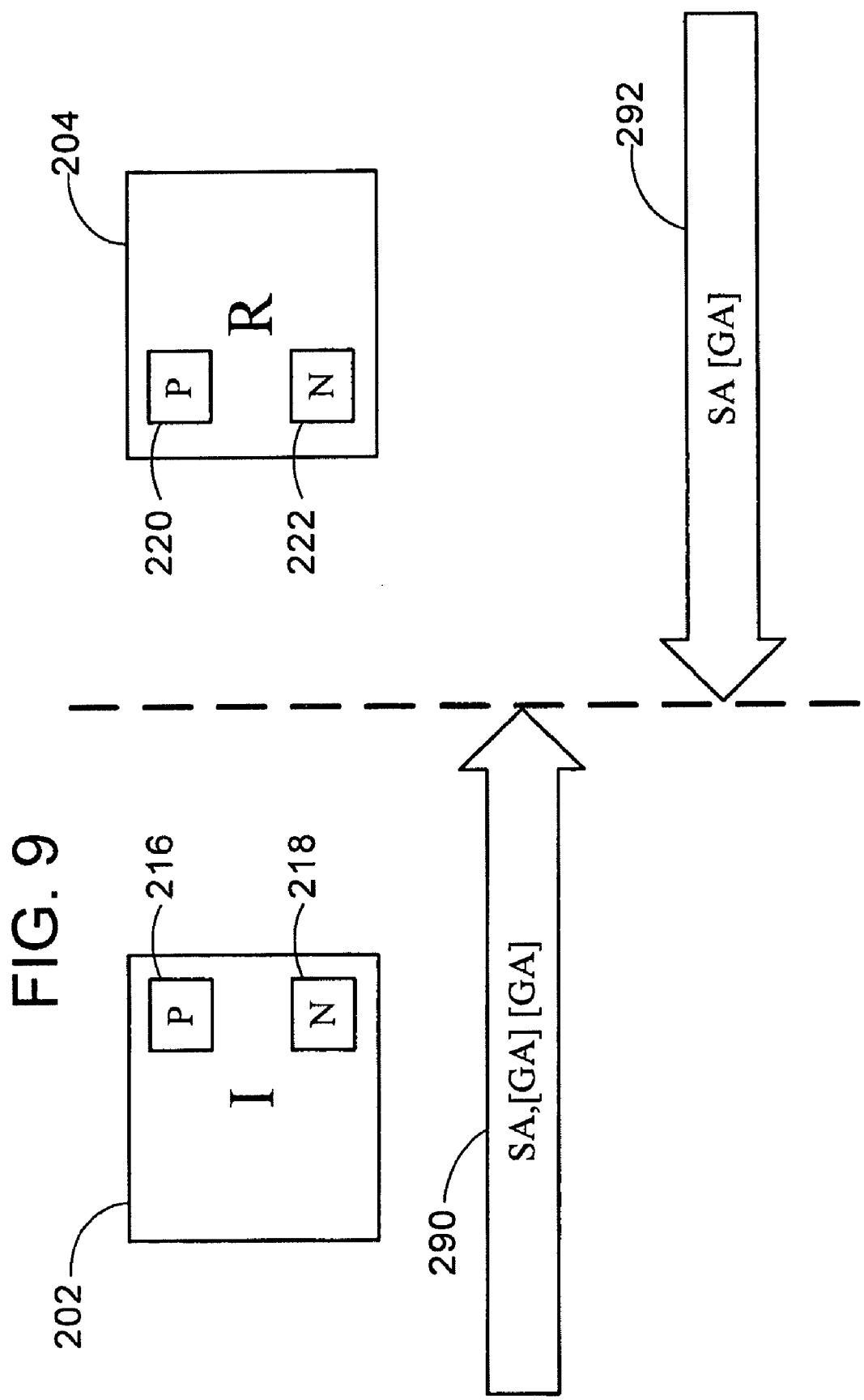
FIG. 9 is a diagram illustrating a method of negotiating security parameters using a group identification.

FIG. 9 illustrates a method wherein the initiator 202 and the responder 204 exchange data that defines one or more groups to which the network devices, or users thereof, belong. The initiator 202 sends message 290 with more or more group advertisement (GA) payloads in the first main mode 210 exchange. Each GA payload includes data that identifies a group to which the initiator 202 belongs. The data in the GA payload is not a descriptive name that could be utilized by a malicious user intercepting the packet. Instead, the data in the GA payload is a nondescript, such as an arbitrary binary number representing the particular group or a hash function of a group name or number along with other data such as nonce and/or time value.

The responder maintains a data structure that identifies authorized groups. When the responder 204 receives the message 290, the responder determines, based on the GA payload, whether the initiator 202 is in an authorized group. If the initiator 202 is not in an authorized group, the responder 204 does not send a reply and remains silent. This prevents the responder 204 from makings its presence known on the network when receiving a message from an unknown network device, which in turn provides added protection against denial of services attacks.

If the initiator 202 is an approved group, the responder 204 sends the message 292 to the initiator 202 with message 292 including the agreed to SA and optionally the responder's own GA payload type identifying a group of the responder. The responder 204 determines which security policy to apply to communications with the initiator 202 based upon the selected group.

Figure 10:
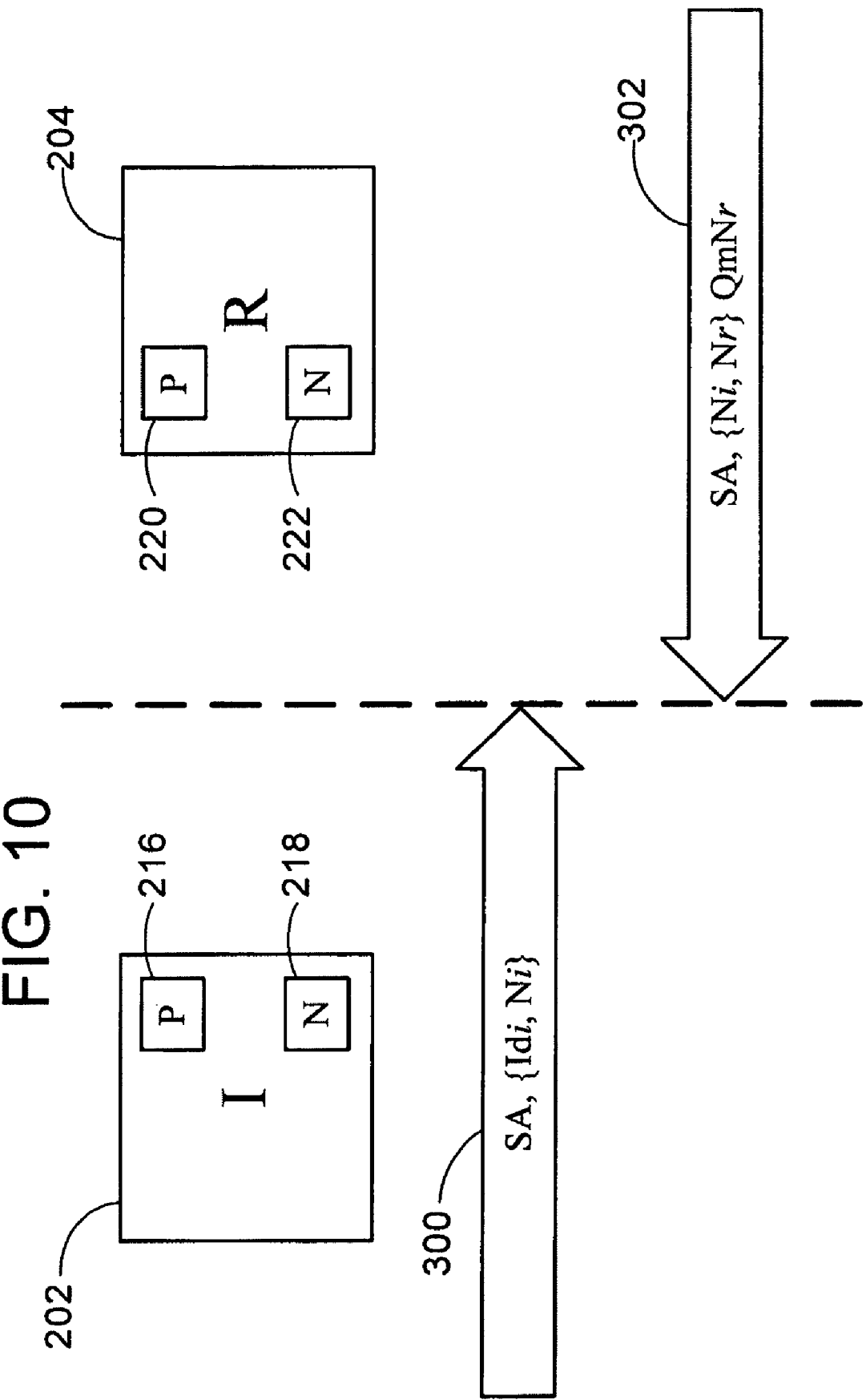
FIG. 10 is a diagram illustrating a method of negotiating security parameters using a previously identified public key.

FIG. 10 illustrates of method of conducting the main mode 210 and quick mode 212 when the initiator 202 knows the identity of the responder 204 and also knows a public key of the responder 204 before the main mode 210 begins. This may occur, for example, when the responder 204 and the initiator 202 email identity information to each other before the main mode 210 begins.

The method of FIG. 10 is similar to that shown and described with reference to FIG. 4. However, because the initiator 202 has the public key of the responder 204 before the negotiation begins, the initiator 202 can send information in the initial message in an encrypted form thereby preventing access to that information from the malicious user. For example, message 300 is sent from the initiator 202 to the responder 204 with the $N_i$ payload encrypted using the public key of the responder 204. An $Id_i$ payload is also be included within an encrypted payload. The response message 302 from the responder 204 to the initiator 202 includes $N_r$ and $N_i$ payloads encrypted with the initiators public key. The negotiation continues as described with reference to FIG. 4.

Figure 11:
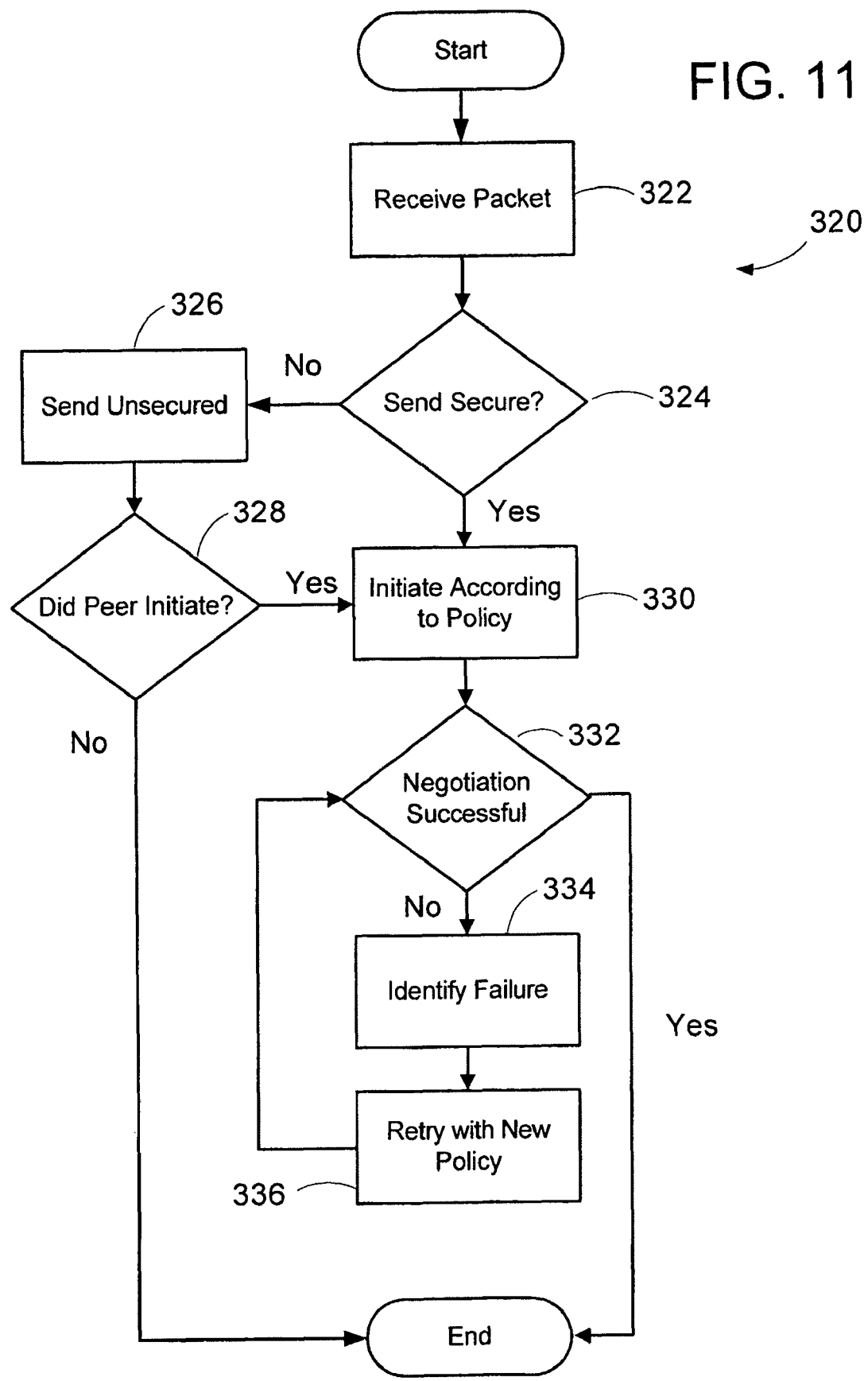
FIG. 11 is a flow diagram illustrating a method used by an initiator to conduct a security negotiation.

FIG. 11 illustrates a method 320 used by the initiator 204 to communicate with the responder 204 over the network 208. In step 322, the operating system 134 in the initiator 202 receives a packet or data to be sent from the initiator 202 to the responder 204. The negotiation module 218 determines whether the packet needs to be sent secure, for example according to the ESP or AH protocols, as shown in step 324. The determination of whether to send the packet secure is based upon the security policy 216 of the initiator 202.

If the negotiation module 218 determines that secure communication is not required, the packet is sent unsecured as a standard IP packet as shown in step 326. When the responder 204 sends a return message, the initiator 202 determines whether the responder 204 initiated a security negotiation, as shown in step 328. The responder 204 initiates the security negotiation if the security policy 220 of the responder 204 requires secure negotiation with the initiator 202. The responder 204 initiates communication with message 284. As previously described, the message 284 includes a PH payload that identifies acceptable security policy of the responder 204.

If the responder 204 does not initiate a security negotiation, the process ends as shown and communication between the initiator 202 and responder 204 is conducted using standard IP.

If the negotiation module 218 of the initiator 202 requires secure communication, or if the responder 204 initiates a security negotiation, the negotiation module 218 of the initiator 202 initiates a security negotiation as shown in step 330. The security negotiation is conducted according to the methods previously described herein with references to FIG. 4-FIG. 9. The security parameters used by the initiator 202 depend on the security policy 216 of the initiator 202 and any PH payloads previously sent from the responder 204 to the initiator 202.

In step 332, the negotiation module 218 determines whether the security negotiation was successful. If the negotiation was successful, the process ends as shown. If the negotiation was not successful, the negotiation module 218 identifies the reason for the failure as shown in step 334. An unsuccessful security negotiation occurs if the initiator 202 sends proposed SAs to the responder 204 that are not in accordance with the security policy 220 of the responder 204. When that occurs, the responder 204 sends a PH payload in message 288 as previously described. The negotiation also fails when the responder 204 sends an unacceptable parameter, such as a certificate in a CERT payload as previously described.

The initiator 202 then attempts a new negotiation as shown in step 336. The new security negotiation is conducted by beginning a new main mode 210. If a PH payload was received from the responder 204, the initiator 202 sends the first message 252 with a proposed SA payload that conforms to the data in the PH payload. If the negotiation failed because of an unacceptable parameter sent from the responder 204, the initiator sends the $Id_r$ payload in message 256 that notifies the responder 204 to send a different parameter during the new negotiation.

The process 320 continues until a successful security negotiation is completed or alternatively, for a set number of iterations.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for executing a security policy at a first network device wherein the first network device is communicatively coupled to a second network device over a computer network, comprising:
 initiating a first main mode negotiation at the first network device by sending a first main mode message with a first set of proposed security parameters;
 determining, at the first network device, that the first main mode negotiation is unsuccessful, wherein the determination is based at least in part on a first response message received from the second network device;
 in response to receiving the first response message, initiating a second main mode negotiation, at the first network device, by sending a second main mode message with a second set of proposed security parameters; and receiving a second response message comprising at least part of a response to the second main mode message and at least part of a quick mode negotiation, wherein the second response message includes a main mode pseudo random number and a separate quick mode pseudo random number.

2. The method of claim 1, wherein the unsuccessful first main mode negotiation results from the first set of proposed security parameters failing to conform to a security policy of the second network device and wherein the second set of proposed security parameters conform to the security policy of the second network device.

3. The method of claim 1, wherein the unsuccessful first main mode negotiation results from a first certificate sent from the second network device to the first network device, wherein the first certificate is invalid, the second main mode negotiation further comprising:
sending a certificate request from the first network device to the second network device that includes an identification payload requesting a second certificate from the responder such that the second certificate is distinct from the first certificate.

4. The method of claim 1, further comprising before initiating the first main mode negotiation, receiving a packet at the first network device for the second device and determining whether the packet must be sent securely to the second network device.

5. The method of claim 4, wherein the packet must complies with an encapsulating security protocol (ESP).

6. The method of claim 4, wherein the packet must complies with an authentication header (AH) protocol.

7. The method of claim 4, wherein if the packet a standard IP packet.

8. The method of claim 7, further comprising determining if the second network device initiates a main mode negotiation.

9. The method of claim 8, wherein if the second network device initiates a security policy, the first network device initiates a main mode negotiation according to the security policy initiated by the second network device.

10. A computer storage medium not consisting of a propagated signal for executing computer-readable instructions for executing a security policy at a first network device wherein the first network device is communicatively coupled to a second network device over a computer network, comprising:
initiating a first main mode negotiation at the first network device by sending a first main mode message with a first set of proposed security parameters;
determining, at the first network device, that the first main mode negotiation is unsuccessful, wherein the determination is based at least in part on a first response message received from the second network device;
in response to receiving the first response message, initiating a second main mode negotiation at the first network device by sending a second main mode message with a second set of proposed security parameters; and
receiving a second response message comprising at least part of the second main mode negotiation and at least part of a quick mode negotiation, wherein the second response message comprises a main mode pseudo random number and a separate quick mode pseudo random number.

11. The computer storage medium of claim 10, wherein the unsuccessful first main mode negotiation results from the first set of security parameters failing to conform to a security policy of the second network device and wherein the second set of proposed security parameters conform to the security policy of the second network device.

12. The computer storage medium of claim 10, wherein the unsuccessful first main mode negotiation results from a first certificate sent from the second network device to the first network device, wherein the first certificate is invalid, the second main mode negotiation further comprising:
sending a certificate request from the first network device to the second network device that includes an identification payload requesting a second certificate from the responder such that the second certificate is distinct from the first certificate.

13. The computer storage medium of claim 10, further comprising before initiating the first main mode negotiation, receiving a packet at the first network device for the second device and determining whether the packet must be sent securely to the second network device.

14. The computer storage medium of claim 13, wherein the packet complies with an encapsulating security protocol (ESP).

15. The computer storage medium of claim 13, wherein the packet complies with an authentication header (AH) protocol.

16. The computer storage medium of claim 13, wherein if the packet is a standard Internet Protocol (IP) packet.

17. The computer storage medium of claim 13, further comprising determining if the second network device initiates a main mode negotiation.

18. The computer storage medium of claim 17, wherein if the second network device initiates a security policy, the first network device initiates a main mode negotiation according to the security policy initiated by the second network device.

19. A system for executing a security policy at a first network device wherein the first network device is communicatively coupled to a second network device over a computer network, the system comprising:
one or more processing units;
a memory coupled with and readable by the one or more processing units, the memory containing a series of instructions that, when executed by the one or more processing units, cause the one or more processing units to perform a method of executing a security policy comprising the steps of:
receiving a packet;
determining if the packet must be sent securely;
if the packet must be sent securely, initiating a security policy, wherein initiating a security policy comprises:
initiating a first main mode negotiation at a first network device by sending a first main mode message with a first set of proposed security parameters;
determining, at the first network device, that the first main mode negotiation is unsuccessful, wherein the determination is based at least in part on a response message received from the second network device;
in response to receiving the first response message, initiating a second main mode negotiation at the first network device by sending a second main mode message with a second set of proposed security parameters;
receiving a second response message in response to the second main mode message, wherein the second response message comprises at least part of a quick mode negotiation for deriving a set of keys.

* * * * *